(12) United States Patent
Cao et al.

(10) Patent No.: US 11,038,916 B1
(45) Date of Patent: Jun. 15, 2021

(54) ON-DEMAND SCANNING OF E-MAIL ATTACHMENTS

(71) Applicants: Jing Cao, Nanjing (CN); Quan Yuan, Nanjing (CN); Bo Liu, Nanjing (CN)

(72) Inventors: Jing Cao, Nanjing (CN); Quan Yuan, Nanjing (CN); Bo Liu, Nanjing (CN)

(73) Assignee: TREND MICRO, INC., Tokyo (JP)

( * ) Notice: Subject to any disclaimer, the term of this patent is extended or adjusted under 35 U.S.C. 154(b) by 312 days.

(21) Appl. No.: 16/249,555

(22) Filed: Jan. 16, 2019

(51) Int. Cl.
*H04L 29/06* (2006.01)
*H04L 29/08* (2006.01)
*H04L 12/58* (2006.01)

(52) U.S. Cl.
CPC ............ *H04L 63/145* (2013.01); *H04L 51/08* (2013.01); *H04L 67/02* (2013.01)

(58) Field of Classification Search
CPC ........ H04L 63/145; H04L 51/08; H04L 67/02
See application file for complete search history.

(56) References Cited

U.S. PATENT DOCUMENTS

| | | | | |
|---|---|---|---|---|
| 7,577,689 B1 * | 8/2009 | Masinter | ............ | G06F 11/1464 |
| 8,775,520 B1 * | 7/2014 | Lewis | ................... | H04L 51/066 |
| | | | | 709/206 |
| 9,722,973 B1 * | 8/2017 | Kothari | ............... | H04L 63/0435 |
| 10,909,245 B1 * | 2/2021 | Saxonberg | ............ | G06F 21/568 |
| 2002/0004908 A1 * | 1/2002 | Galea | .................. | H04L 63/1416 |
| | | | | 726/24 |
| 2003/0097409 A1 * | 5/2003 | Tsai | ..................... | H04L 63/1416 |
| | | | | 709/206 |
| 2008/0071639 A1 * | 3/2008 | Jacobs | ............... | G06Q 30/0619 |
| | | | | 705/26.8 |
| 2013/0124656 A1 * | 5/2013 | Peng | ..................... | H04L 51/066 |
| | | | | 709/206 |
| 2013/0124966 A1 * | 5/2013 | Helder | .................... | G06F 16/93 |
| | | | | 715/230 |
| 2015/0271117 A1 * | 9/2015 | Massand | ................ | H04L 51/08 |
| | | | | 715/752 |
| 2016/0269329 A1 * | 9/2016 | Willis | ..................... | H04L 51/08 |
| 2019/0087489 A1 * | 3/2019 | Culhane | ............... | G06F 40/205 |
| 2020/0412740 A1 * | 12/2020 | Goutal | .................... | H04L 51/18 |

* cited by examiner

*Primary Examiner* — Arvin Eskandarnia
(74) *Attorney, Agent, or Firm* — Beyer Law Group LLP (57) ABSTRACT

An attachment to an e-mail message received at an e-mail gateway is scanned by a scan server and then is converted into an HTML file. The HTML file includes preview data of the attachment (minus any macro scripts), the entire original data of the attachment, scan functionality enabling a user to send the attachment back to a scan server for a second scan, or extract functionality enabling a user to extract the original attachment data for saving or opening in an application. The recipient is able to open or save the attachment directly if he or she believes it comes from a trusted sender. If the attachment seems suspicious, the recipient previews the attachment first before performing a scan, opening the attachment or deleting it. The recipient performs a scan of the attachment by clicking a "scan" button to send the attachment to a backend server for a second scan where an updated virus pattern file may be available to detect any zero-day malware.

23 Claims, 9 Drawing Sheets

System

FIG. 1
System

From: king_cao@trendmicro.com <king_cao@trendmicro.com>
Sent: Tuesday, December 18, 2018 12:04AM
To: John
Subject: Sample Message with Attached Document Dear John, This is a sample e-mail message with an attachment.

Regards,
King

From: king_cao@trendmicro.com <king_cao@trendmicro.com>
Sent: Tuesday, December 18, 2018 12:04AM
To: John
Subject: Sample Message with Attached Document Dear John, This is a sample e-mail message with an attachment.

Regards,
King

From: king_cao@trendmicro.com <king_cao@trendmicro.com>
Sent: Tuesday, December 18, 2018 12:04AM
To: John
Subject: Sample Message with Attached Document Dear John, This is a sample e-mail message with an attachment.

Regards,
King

42

This is a test file. 44'

```
<!DOCTYPE html>
<html xmlns="http://www.w3.org/1999/xhtml">
<head>
    <meta charset="utf-8" />
    <script src="https://code.jquery.com/jquery-3.3.1.min.js"></script>

<script>
        $(document).ready(function() {
                        $("#content") .hide( ) ;
                        $("#restore") .hide( ) ;

$("#open_content") .click(function( ) {            ⎤
                                $("#content") .show( ) ;                   |
                                $("#open_content") .hide( ) ;              ⎬ 304
                    $("#extract") .hide() ;                                |
                                $("#restore") .show( ) ;                   |
                        });                                                ⎦

$("#scan_on_demand") .click(function( ) {          ⎤ 308
            alert("Send data to backend server for on-demand scanning!!!");⎦

// $ . ajax ({                                  ⎤
                //   type:  "POST",                             |
                //   url:  <backend-server>,                    |
                //   data:  <data from original-doc>,           ⎬ 310
                //   success: function(data) {...},             |
                //   dataType:  "json"                          |
                //});                                           |
                        });                                     ⎦

$ ("#extract") .click (function ( ) {                   ⎤
                alert ("Save original file to local disc. ") ;  ⎬ 312
                // save to local disk                           |
        });                                                     ⎦

$ ( "#restore") .click(function ( ) {   ⎤
                                $ ("#content") .hide ( ) ;      |
                                $ ("#open_content") .show( ) ;  ⎬ 316
                    $ ("#extract") .show( ) ;                   |
                                $("#restore") .hide( ) ;        |
                        });                                     ⎦
                });

</script>
    <title></title>                                 300
</head>
```

FIG. 4

Script Portion of HTML File

```
<body>
    <div id="overview">
        <button id="open_content" type="button" style=" " >Open Directly</button>
        <button id="scan_on_demand" type="button">Scan</button>
        <button id="extract" type="button">Extract</button>
        <button id="restore" type="button">Restore</button>
    </div>
    <div id="content">
        <div id="original-doc"></div>
        <div id="preview-doc"></div>
    </div>
</body>
</html>
```

404 — overview buttons group
408 — original-doc
412 — preview-doc
400

*FIG. 5*

Body Portion of HTML File

ON-DEMAND SCANNING OF E-MAIL ATTACHMENTS

FIELD OF THE INVENTION

The present invention relates generally to the detection of malware on a computer. More specifically, the present invention relates to detecting malware in a suspicious attachment to an e-mail message.

BACKGROUND OF THE INVENTION

For many years, incoming e-mail messages into an enterprise have been the vehicle by which attackers have delivered Advanced Persistent Threats (APT). Typically, the malicious e-mail message allows the attacker to deliver and insert malware into the enterprise's network or onto an end user's computer. The malware thus inserted is able to probe for additional network access or vulnerabilities, communicate with a malicious command and control server (C&C), gather target data from users, and eventually exfiltrate the data off of the enterprise network. In particular, attackers deliver such a threat through a malicious URL or attachment to the e-mail message. Unfortunately, such a malicious attachment can often bypass current antivirus security measures by taking advantage of so-called "zero-day" vulnerabilities, etc. By way of example, there is often a delay between a new attack and the virus pattern update meant to detect that new attack. In other words, a new attack in an attachment may seem benign when it is initially scanned upon receipt at an e-mail gateway because a specific virus signature to detect that attack has not been developed yet. By the time a virus signature is developed to detect that particular attack and a virus pattern file is updated, it may be too late as the message and its attachment has already been delivered to the end user.

One technique used to address suspicious or malicious attachments is attachment rewriting. Although promising, this technique is seldom used for a number of reasons. For one, the attachment will typically be stored on a server computer remote from the enterprise, thus raising privacy concerns, especially under the EU General Data Protection Regulation (GDPR). Latency is also an issue: an end user wishing to open or view the attachment must wait for the attachment to be downloaded from the remote server computer to his or her computer. And, the attachment cannot be searched, which can be problematic for many enterprises. End Users often need to find an important attachment (a confidential file, a past deal, an invoice, etc) in a crowded electronic mailbox for business purposes, so supporting searching of attachments is helpful for end users. Searching of attachments, however, cannot be achieved when using attachment rewriting since the data is kept in a remote server.

In the meantime, attackers continue to deliver threats via malicious e-mail messages and attachments. A technique and system that would allow end users and enterprises to detect malicious attachments in e-mail messages is desired.

SUMMARY OF THE INVENTION

To achieve the foregoing, in accordance with the purpose of the present invention, a technique is disclosed that allows an end user to more easily scan suspicious e-mail attachments in order to detect malicious attachments and to view legitimate attachments.

The present invention has a number of advantages that address problems in the prior art. For one, the suspicious attachment is not stored in a server computer remote from the enterprise; the attachment is embedded in an HTML file so that only the intended recipient can access the attachment. Thus, leakage of private data is far less likely.

The recipient is able to open or save the attachment directly if he or she believes it does come from a trusted sender. If the attachment seems suspicious, the recipient is able to preview the attachment before making a decision such as performing a scan, opening the attachment or deleting it. The recipient is able to perform further scanning of the attachment by simply clicking a "scan" button in order to send the attachment to a backend server computer for further analysis. The invention takes advantage of the fact that an end user may not view a particular e-mail message immediately nor click on the attachment to open it because he or she is busy doing other things. During this delay, it is possible that a new virus pattern file has been deployed on a scan server that will detect malware in the attachment. For example, when "zero-day" malware is first detected, it is possible for a virus signature to be developed to detect that malware in a number of minutes (less than one hour), in one or two hours, or perhaps within several hours. For some viruses, the time is based upon volume and statistics. The more similar the attachments analyzed by a backend server, the more confidence the backend server will have regarding detecting suspicious attachments.

In a first embodiment an e-mail message with an attachment is received at an e-mail gateway of an enterprise. The attachment is converted into an HTML file such that the HTML file includes at least some of the text of the attachment in HTML format, and also includes preview functionality enabling a user to preview the text when the HTML file is executed in a browser of the user's computer.

In a second embodiment an e-mail message with an attachment is received at an e-mail gateway of an enterprise. The attachment is converted into an HTML file such that the HTML file includes all data of the attachment and scan functionality enabling a user to send the attachment from user computer to a scan server when the HTML file is executed in the browser of the user's computer.

In a third embodiment an e-mail message with an attachment is received at an e-mail gateway of an enterprise. The attachment is converted into an HTML file such that the HTML file includes all data of the attachment and extract functionality enabling a user to extract all of the data of the attachment (in order to save it locally or to open it in a corresponding application) when the HTML file is executed in the browser of the user's computer.

In a fourth embodiment an e-mail message with an attachment is received at an e-mail gateway of an enterprise. The attachment is removed from the e-mail message and then the text from the attachment is inserted into the body of the e-mail message. The e-mail message with the inserted text is then delivered to a user computer so that the user may view the text when opening the e-mail message.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The invention provides an effective way to handle suspicious attachments in e-mail messages by wrapping HTML code around the suspicious attachment. Basically, the data of each attachment of an incoming e-mail message is embedded into an HTML file, i.e., the HTML file is wrapped around the attachment. Next, JavaScript in the HTML file is used to provide various options to end users when opening that HTML file. The end user may choose to open the original attachment in a preview mode, perform an on-demand scan in which the data of the attachment is sent to a backend server for scanning, or extract the data of the attachment from the HTML file for saving on to the user's hard disk. Also, wording from the attachment may be extracted and added into the plain text portion of an e-mail message (such as a MIME message supporting multi-part content). This wording can then be indexed by a suitable e-mail client for searching purposes.

System Diagram

Figure 1:
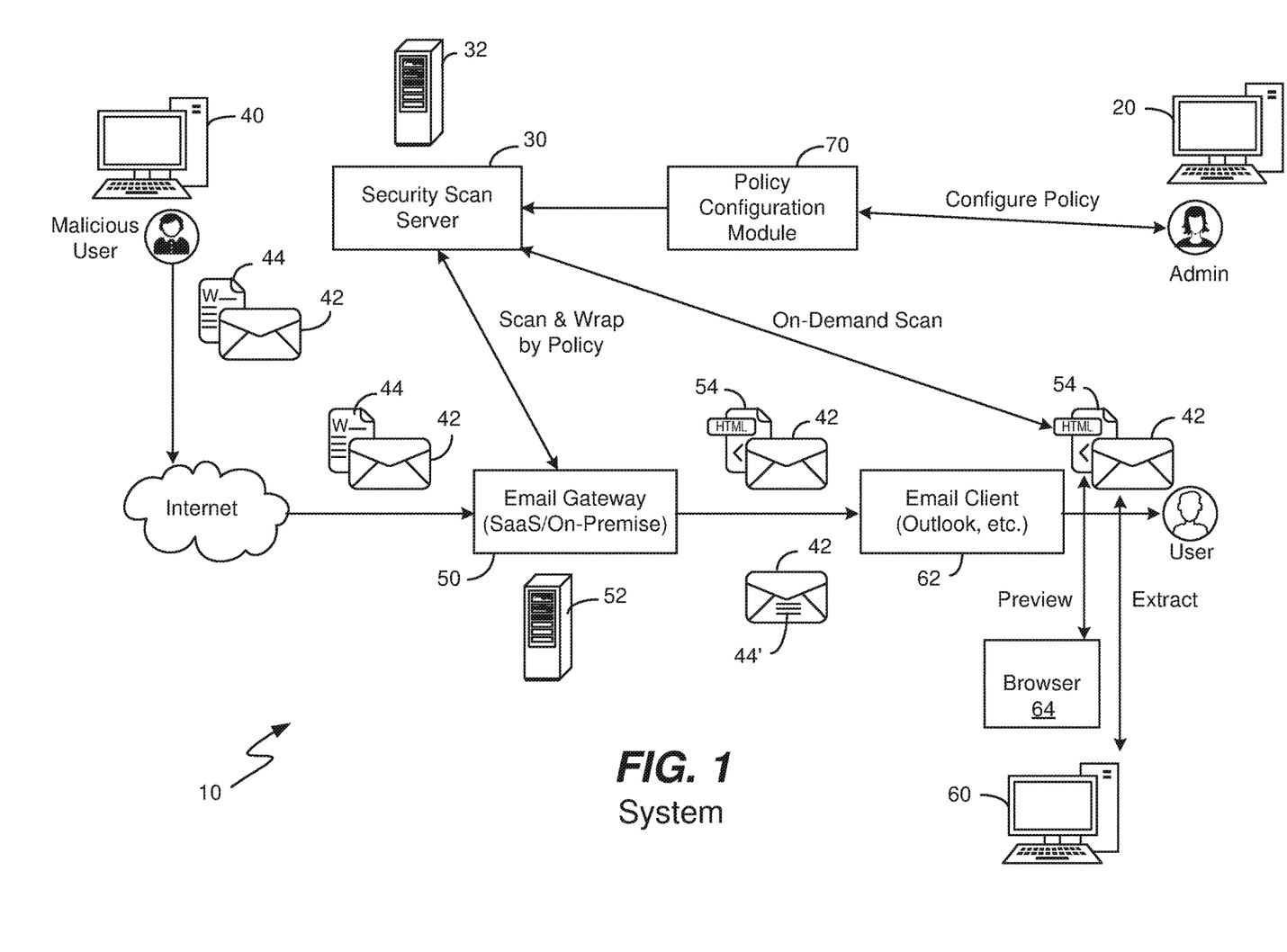
FIG. 1 illustrates a system for implementing various embodiments of the invention.

FIG. 1 illustrates a system 10 for implementing various embodiments of the invention. Shown is a computer 20 used by an administrator of an enterprise to configure various policies relating to malware detection using a policy configuration module 70. Typically, policy configuration module 70 is a component of scan server 30 and also executes upon server computer 32, although it may also execute upon a separate server computer. Module 70 may be implemented as a Web portal which is accessed by the administrator over an Internet or local network connection.

One example of a policy is what to do when malware is detected by security scan server 30 when it scans incoming e-mail messages and attachments as requested by e-mail gateway 50. The policy may dictate that when malware is detected that the particular e-mail message is blocked from being delivered, is placed into quarantine, is deleted, etc., or if malware is detected in an attachment the policy may dictate that the attachment is stripped from the e-mail message, the attachment is modified to make it benign, a warning is sent to the end user, etc. Another policy relevant to the present invention is what action should be taken when no malware is detecting in the incoming e-mail message or attachment. In this situation, although it is possible that the message is benign, is also possible that the message or attachment contains zero-day malware for which no virus signature or heuristic yet exists to detect it. As will be discussed in greater detail below with respect to step 220, this policy may dictate that all incoming attachments shall be converted into HTML files using the present invention, that only suspicious attachments should be converted, or that no attachments should be converted. A suspicious attachment may be detected using the VSAPI engine developed by Trend Micro Inc., or other software products such as Symantec Antivirus Software, VirusTotal and so on. In general, an attachment may be considered suspicious if it modifies system files, encrypts files as in ransomware, installs software unintentionally, etc.

Security scan server 30 is a software module executing upon server computer 32 arranged to routinely scan incoming e-mail messages and attachments as requested by e-mail gateway 50, or to perform an on-demand scan of an attachment as requested by user computer 60. Scan server 30 may use any suitable scanning technique known in the art such as comparing files or messages to virus signatures or virus pattern files, using heuristics to detect malware, behavior-based detection, use of machine learning algorithms, use of sandboxes, etc.

It is realized that virus pattern files are updated frequently in response to new threats that are detected, and it is further realized that it is advantageous to allow the scan server to perform an additional on-demand scan received from an end-user computer in order to detect a malicious attachment using a new virus pattern file that may not have been present when the attachment was first scanned by the scan server. In one particular embodiment, scan server 30 uses the products IMSVA, DDEI, HES, and CAS available from Trend Micro, Inc. In addition, scan server 30 is arranged to convert attachments into HTML files as will be discussed in greater detail below.

Also shown in FIG. 1 is a computer 40 used by a malicious user to send an e-mail message 42 with an attachment 44 that includes malware. Attachment 44 may be any Microsoft Office document (such as a Microsoft Word, Excel, PowerPoint, etc.), may be a PDF file, or any other suitable document type that is able to be converted into an HTML file as described below. Other document types that can be converted into HTML include image files (such as JPEG, BMP, etc.), RTF (Rich Text Format), and Web pages (such as HTML, HTM, MHT, etc).

The malware in the attachment is typically in the form of a macro which has an AutoRun script embedded within it. The malware may take other forms in order to leverage the zero-day vulnerability of software, for example, vulnerabilities of Adobe Reader software. In the simple example used below, attachment 44 is a Microsoft Word file containing a single sentence which is not malware and does not come from a malicious user, but, it is certainly possible that attachment 44 may contain malware.

Figure 2:
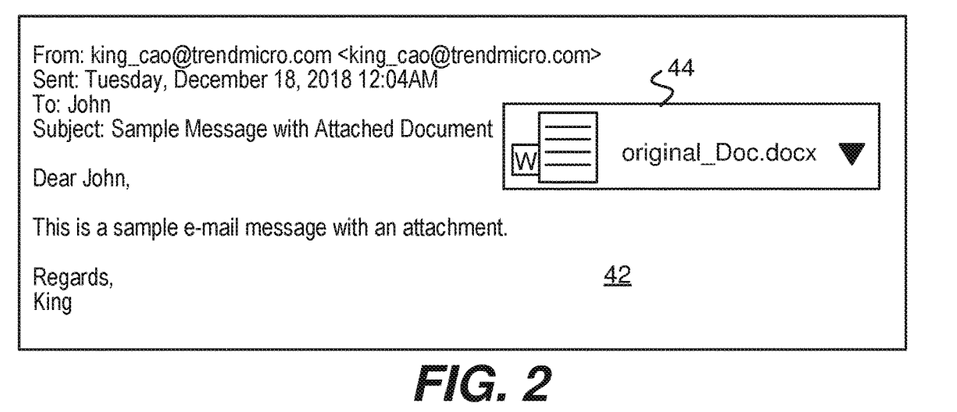
FIG. 2 illustrates such an example e-mail message having an attachment as it would appear if delivered directly to an end user computer without modification.

FIG. 2 illustrates such an example e-mail message 42 having attachment 44 as it would appear if delivered directly to an end user computer without modification. In this example, the content of attachment 44 is a single sentence: "This is a test file."

E-mail gateway 50 is a software module as known in the art that receives e-mail messages over an Internet connection (such as message 42 with attachment 44) and distributes those e-mail messages to end users within an enterprise using policies configured by administrator using computer 20. E-mail gateway 50 may execute upon server computer 52 within the enterprise or may also execute upon the same server computer as scan server 30. According to a first policy, the e-mail gateway will request scans of incoming e-mail messages from scan server 30 before delivering those messages to end users. E-mail gateway 50 may be an on-premise software module (such as Microsoft Outlook, implemented on a computer within the enterprise) or may be implemented as software as a service (SaaS) in which case the gateway is implemented upon a server computer in the cloud (such as the Webmail version of Outlook, "Office 365", one of the Microsoft "Office.com" suite of applications).

When a second policy dictates that an attachment should be converted to an HTML file of the present invention, the gateway delivers this message 42 with its HTML attachment 54 to the end-user computer 60 via its local e-mail client 62 (or to the browser 64 if Webmail is used). In another embodiment described below, the e-mail message 42 will be delivered containing text 44' of the attachment 44 which has been inserted into the body of the e-mail message. As will be discussed in greater detail below, the end user using computer 60 will then have the option to preview the attachment 54 in a browser, request an on-demand scan of attachment 44, or extract the attachment 44 save it to disk on his or her computer 60.

Flow Diagram—Replace Attachment

Figure 3:
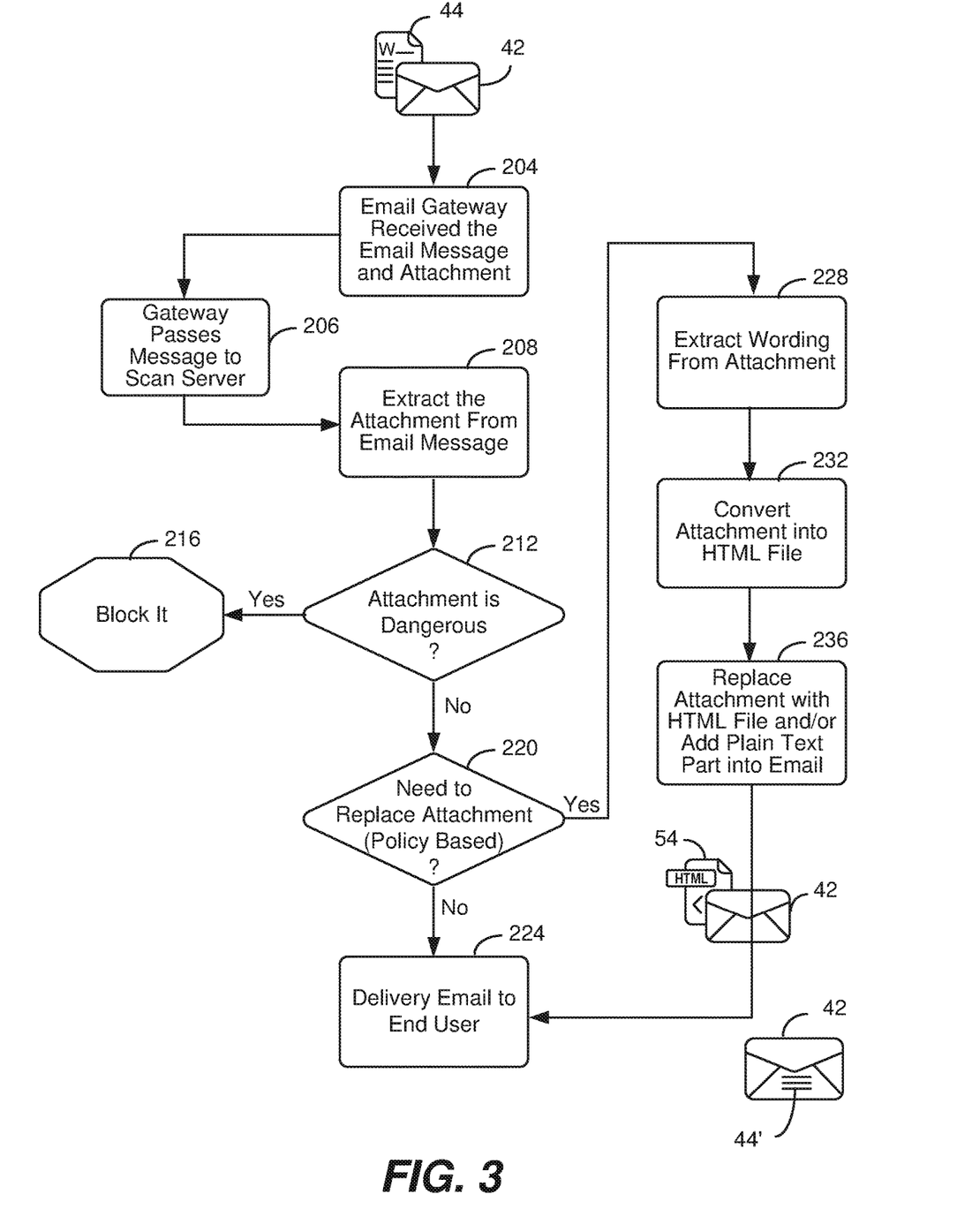
FIG. 3 is a flow diagram describing one embodiment by which an attachment of an e-mail message is converted into an HTML file for delivery to an end user.

FIG. 3 is a flow diagram describing one embodiment by which an attachment of an e-mail message is converted into an HTML file for delivery to an end user. In a first step 204 an e-mail message 42 along with its attachment 44 is received at e-mail gateway 50. As mentioned before, gateway 50 may be executing upon a computer within the enterprise or may be executing upon a remote computer of a cloud service to which the enterprise subscribes. If the e-mail gateway is SAAS ("software as a service") and is located in the cloud, the scan server may also be located in the cloud. In a next step 206 the gateway passes the received e-mail message and attachment to scan server 30. The gateway and scan server can use task queues to exchange messages and scan results. Or, the gateway can provide an interface in order to exchange messages and results with the scan server.

In step 208 the scan server extracts the attachment from the e-mail message in order to perform an analysis. In step 212 the scan server determines whether or not the attachment is dangerous, i.e., whether that the attachment includes malware. This analysis may be performed in various manners, such as by comparing the attachment to a virus pattern file, by using heuristics, machine learning, or other techniques based upon artificial intelligence. In one particular embodiment, the scan server uses the VSAPI product available from Trend Micro Inc. If malware is determined to be present then in step 216 and the scan server takes appropriate action (in conjunction with the e-mail gateway) such as blocking the e-mail message, removing the attachment and allowing the message to continue to the user, deleting the e-mail message and its attachment, placing the message into quarantine folder, etc., all actions that are dictated by a policy of the enterprise.

If malware is determined not to be present in the attachment then in step 220 the scan server determines whether or not to replace attachment (i.e., convert it into an HTML file or extract its text) based upon a second policy of the enterprise as discussed above. If the policy is not to replace any attachments or the policy is only to replace suspicious attachments, and the attachment is not deemed to be suspicious, then in step 224 the e-mail message and its attachment is delivered to the end user, such as to computer 60. FIG. 2 shows an example in which the e-mail message 42 along with the original attachment 44 has been delivered to the end user without any modification of the attachment.

On the other hand, if the policy is to replace all attachments, or if the policy is to replace only suspicious attachments, and the attachment is deemed to be suspicious, then control moves to steps 228 and 232.

Because of zero-day vulnerabilities, it is possible that the scan server will scan an attachment using a current virus pattern file that does not include a virus signature (or virus definition) for new, zero-day malware that is present in the attachment. In this situation, it is possible that the scan server will determine that no malware is in the attachment even though the attachment does include the new malware. If the policy is to replace all attachments or to replace suspicious attachments, then the present invention will operate as described below in order to convert the attachment into an HTML file and it is possible that the user will choose to perform an on-demand scan of the attachment again at a later time. If so, it is possible that in the meantime a new virus signature has been developed for the zero-day malware that is present in the attachment, that this new virus signature is now present in an updated virus pattern file used by the scan server, and that this second scan will then detect the zero-day malware in the attachment.

Step 228 and 232 represent two different embodiments of the invention that may both be practiced together, or may be practiced separately. If practiced together, steps 228 and 232 may be performed serially (in either order) or may be performed in parallel. Preferably, step 232 is always performed and step 228 is optional. It is also possible to perform step 228 and not step 232. In step 228 the scan server extracts the wording (i.e., the text) from the attachment using a software engine such as eManager or an open source library such as xpdf (https://www.xpdfreader.com) orLibreOffice (https://www.libreoffice.org). This technique works for all Microsoft files in the Office Document products: Word (.doc, .docx), Excel (.xls, .xlsx), PowerPoint (.ppt, .pptx) and Publisher. This step is typically performed in situations where the e-mail client, browser or other end-user software does not support HTML. This extracted wording will then be placed into the body of the e-mail message as will be described below.

In step 232 the attachment is converted into an HTML file. The attachment (e.g., a Microsoft Office document such as Word, Excel, etc.) is first converted into a PDF file using a suitable routine from Library Office or using open source software such as OpenOffice or SoftMaker FreeOffice. Next, this PDF file is converted into an HTML file using suitable open source software such as xpdf. In addition, suitable JavaScript code is added to the HTML file to provide user interface buttons and functionality for generating a preview of the attachment, sending the attachment data to the scan server for scanning, extracting the original attachment data so that this may be saved to local disk, restoring the user interface, and generating and displaying alerts, warnings and dialogue boxes in a browser of the end-user computer.

During the conversion of the attachment into a PDF file any macro scripts are removed such that the resulting PDF file does not contain these macros. The reason for this is because most malicious code in attachments is embedded within these macros. Although the conversion attempts to keep the same format of the original attachment, this is not always possible. When the PDF file is converted into the HTML file, the resulting attachment data that does not contain the macros is placed into a special section of the HTML file in HTML format termed "preview data." It is this preview data that will be displayed to the end user when he or she clicks upon the Preview button as will be described below, and as mentioned, it will be in HTML format, will not contain any macro scripts, and may be in a slightly different format from the original attachment. The above software converts the document into PDF format, thus the macros will be removed automatically (similar to "printing" the document).

In addition to the conversion of the original attachment into an HTML file and the placing of the preview data into the HTML file, all of the original attachment data (including any macro scripts, original formatting, etc.) will also be placed into the HTML file into a special section termed "original data." As will be discussed below, the end user will have the option of extracting this original data and storing it locally on disk in order to view exactly what the original attachment was. Advantageously, all of the original attachment data (whether as preview data or original data) will only exist within the HTML file (or possibly within the body of the e-mail message); none of the attachment data remains on the scan server after the e-mail message has been delivered the end user, nor is any data sent to a remote server computer outside of the enterprise. Thus, the privacy of the user's e-mail messages, attachments, etc., is protected.

The conversion of the attachment first into a PDF file and then from the PDF file into an HTML file may be considered a single conversion, in that both of the conversions may be performed sequentially and automatically by using one softer routine after another. In addition, it is possible to convert directly from the attachment into an HTML file by using custom software, i.e., using a self-implemented engine.

Figure 4:
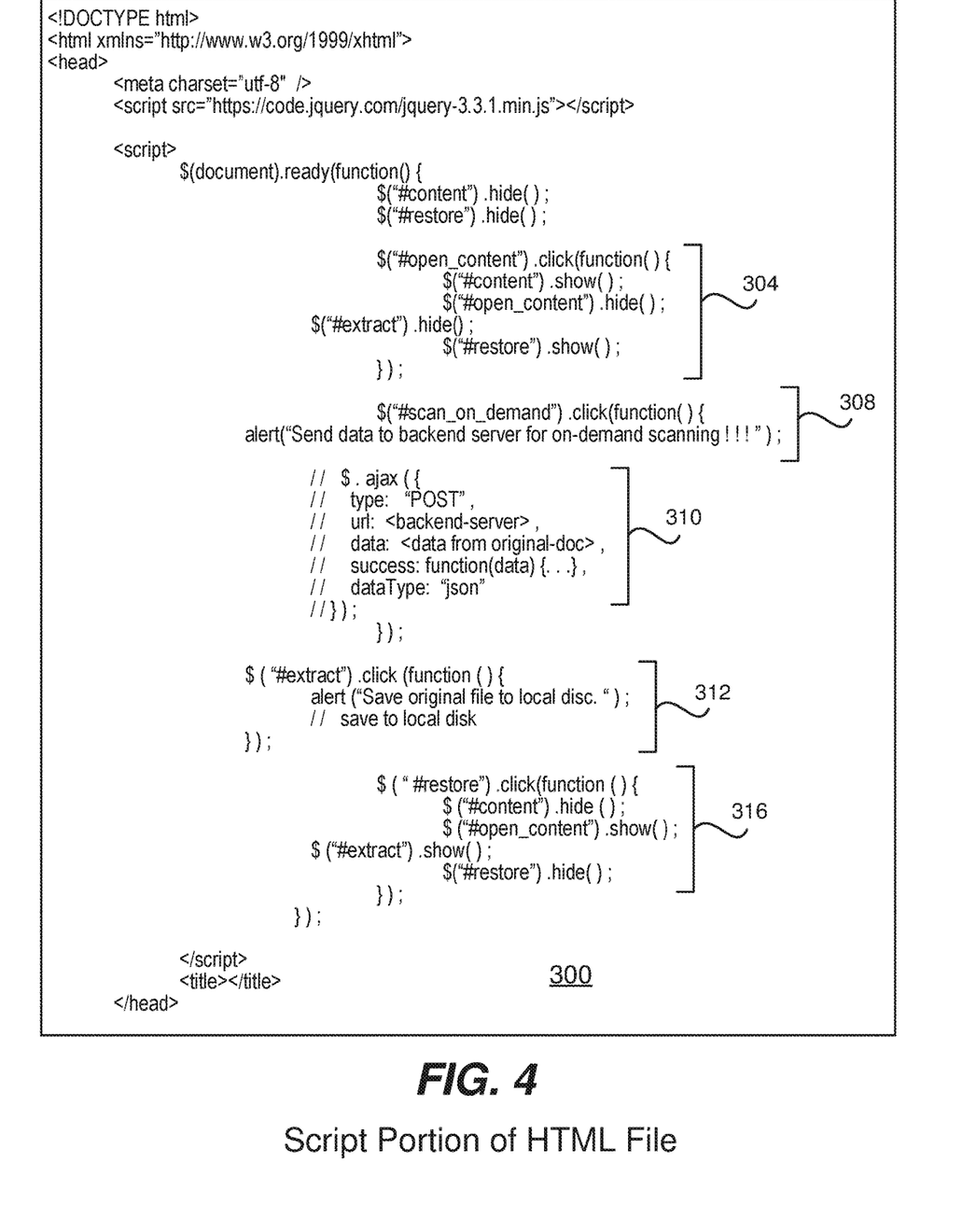
FIG. 4 is the script portion of the HTML file.
Figure 5:
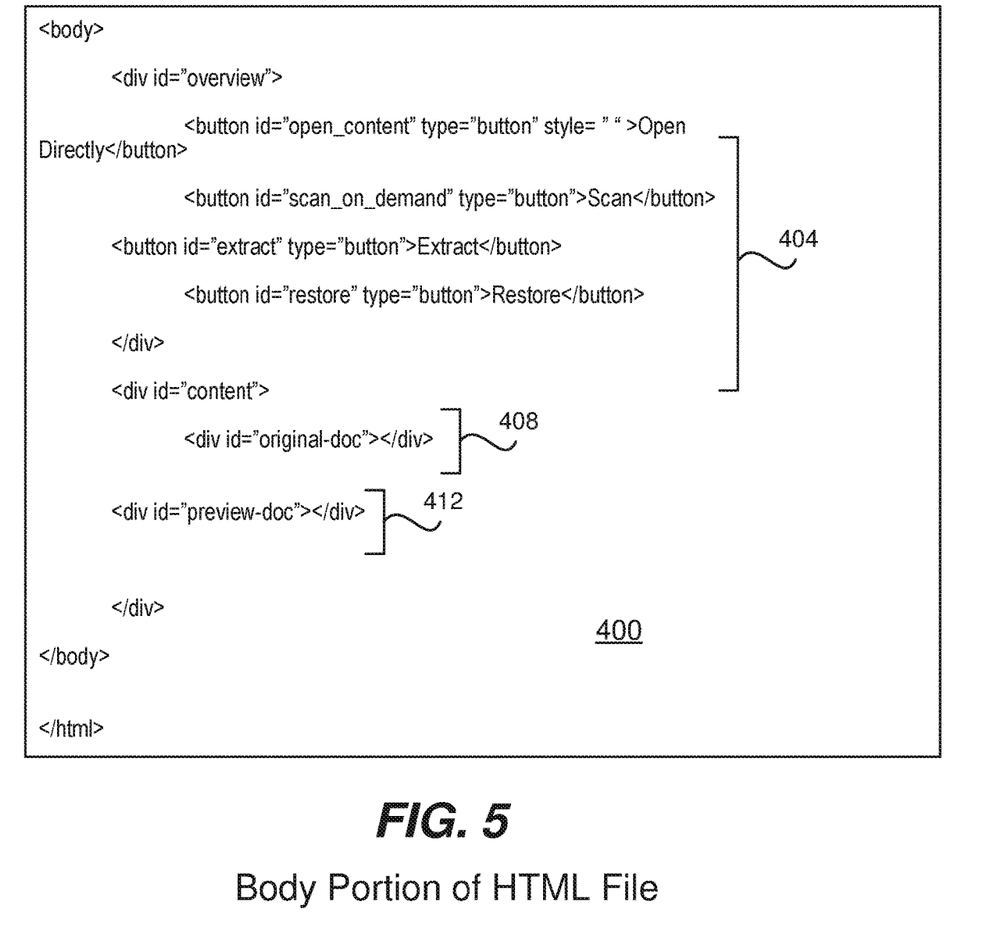
FIG. 5 is the body portion of the HTML file.

FIGS. 4 and 5 show a suitable HTML file that includes the above functionality for presenting a user interface and also for holding the attachment data. FIG. 4 is the script portion 300 of the HTML file and FIG. 5 is the body portion 400 of the HTML file. Shown at 404 is a definition of the various user interface buttons shown when the end user opens the HTML file (described in more detail below); section 408 will include all of the original data from the attachment (including macro scripts, original formatting, etc.), and section 412 will include the preview data in HTML format needed to generate a preview of the attachment.

Shown at 304 is a definition of the function that will generate a preview of the attachment. Section 308 is a definition of the function that will send the attachment data to the backend scan server for on-demand scanning. In this example, the data is not actually sent, but an alert is generated in the user browser for purposes of illustration. Section 310 describes script that may be used to send an HTTP ajax request with the attachment data to the scan server for scanning Section 312 is a definition of the function that will extract all of the original attachment data in order to save it to file on a local disk of computer 60. In this example, the data is not actually extracted or saved, but an alert is generated in the user browser for purposes of illustration. One of skill is able to write script to take the original attachment data from section 408 and save it to the local disk, or, write script to take the original attachment data and open it in a suitable application such as Microsoft Word or Excel. Section 316 is a definition of the function that will restore the user interface.

Once the attachment has been converted into the HTML file then in step 236 the existing attachment 44 of e-mail message 42 is replaced with the newly created HTML file 54 by scan server 30. This step is performed by the TMMSG engine available from Trend Micro, Inc. The TMMSG engine is used to compose a new message with new content (e.g., tag in subject, stamp in body, replaced attachment, etc.) Additionally, if step 228 had been performed to extract the wording from the attachment, then as part of step 236 this plain text wording is then inserted into the body of the e-mail message as modified attachment data 44'. Again, the TMMSG engine is used to compose the new message including removing the attachment. Also, a pre-configured policy can specify that removes malicious attachments directly. The original attachment data will be wrapped into HTML format except for those files on an approved list.

Preferably, if it is not possible or desirable to convert the attachment into an HTML file, then the original attachment is removed from the e-mail message 42 and message 42 will then be delivered to the end user with only modified attachment data 44'. It is also possible to replace the original attachment with HTML file 54 and also insert modified attachment data 44' into e-mail message 42 such that both are delivered to the end user. Thus, if the attachment cannot be converted into an HTML file, the extracted wording may be inserted into the e-mail message and the message will be delivered with that wording.

Next, in step 224 e-mail message 42 is delivered to the end user. Message 42 will either include HTML file 54 or will include modified attachment data 44', although it is also possible to include both. This message 42 is then delivered from gateway 50 to the end-user computer 60. As mentioned, the gateway exchanges message and results with the scan server using a task queue or interface. The gateway handles receiving the message and delivering the message while the scan server handles the scan. The scan server picks the message from the task queue or via the interface, and then composes the new message after scanning. The gateway then delivers the new composed message to the end user. Preferably the scan server deletes the message after it is delivered to the end user. The scan server fetches the original message from the gateway and composes the new message based on the scan result and pre-configured policies, and then passes back the new message to the gateway; the gateway then delivers the new message to the end user. The scan server will not store any data or message; all data will be deleted after finishing the scanning.

Figure 6:
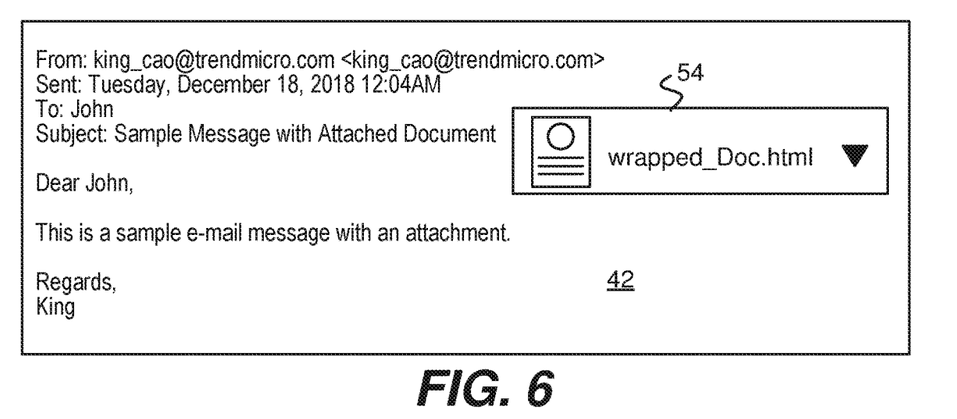
FIG. 6 illustrates the e-mail message that includes the HTML file which has been converted from the original attachment.
Figure 7:
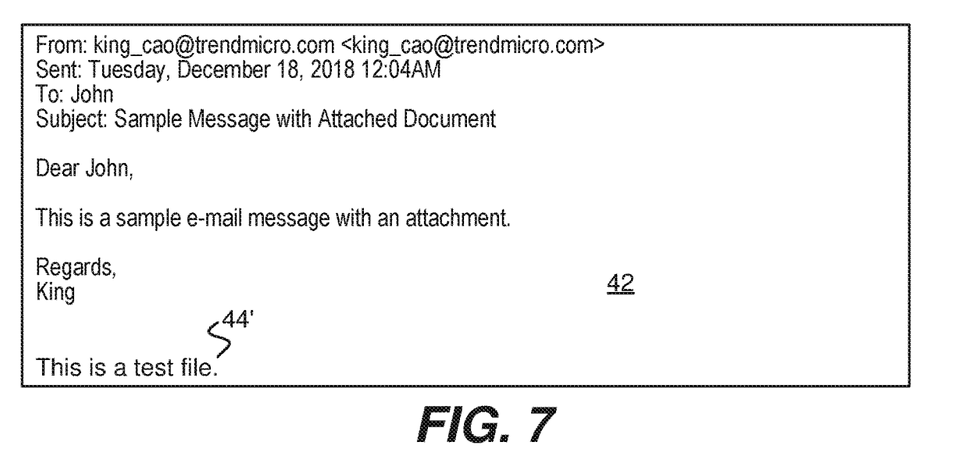
FIG. 7 illustrates the e-mail message that includes the modified attachment data that has been inserted into the body of the e-mail message.

FIG. 6 illustrates the e-mail message 42 that includes HTML file 54 which has been converted from the original attachment 44. FIG. 7 illustrates the e-mail message 42 that includes the modified attachment data 44' that has been inserted into the body of the e-mail message. Not shown is the embodiment in which e-mail message 42 includes both HTML file 54 and modified attachment data 44'. If the end user receives the e-mail message 42 of FIG. 7 which includes the text from the original attachment, the user may also choose to delete the e-mail message based upon the contents of this text. In addition, the user is also able to search through any number of received e-mail messages that also include the attachment data within the body of the e-mail message, such as modified attachment data 44'. There is an advantage because now the text to the attachment is inside the body of the e-mail message. Also, the malware cannot execute if it is in the e-mail message. The plain text in the body can now be searched via the current e-mail client (such as Microsoft "Outlook" etc.).

Flow Diagram—End User Opens HTML File

Assuming that the end user has received an e-mail message 42 such as that shown in FIG. 6 that includes HTML file 54, the end user is now able to preview the attachment data, scan the attachment data, or extract the original attachment data and save it to a local disk. HTML file 54 may include all three of these capabilities (preview, scan and extract), may include only one of these capabilities, or may include a combination of any two of these capabilities. Accordingly, the flow diagram below and the browser displays in FIGS. 9-13 may be modified to reflect that one, two or all three of these capabilities may be of limited. The below describes an embodiment in which all three capabilities are present.

Figure 8:
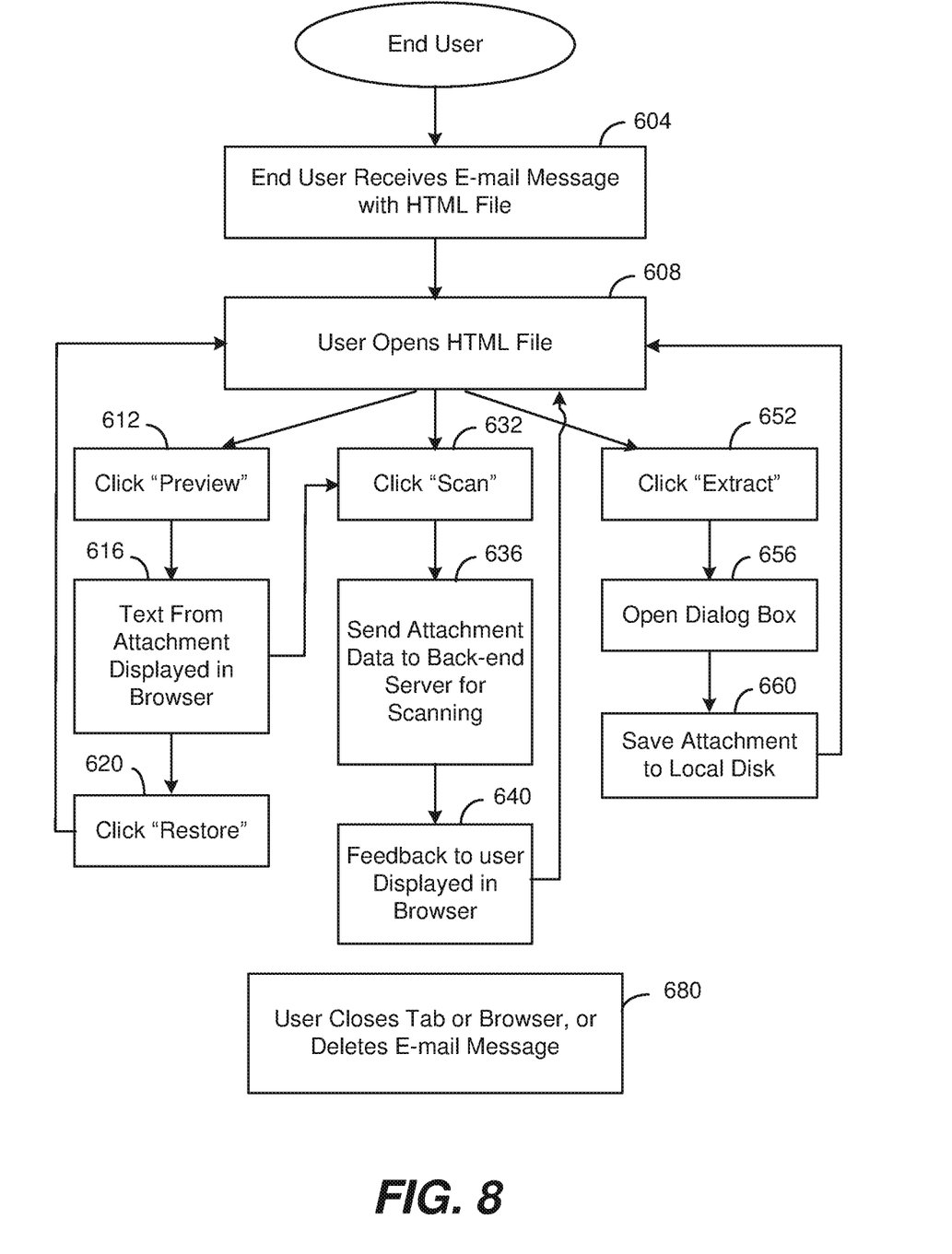
FIG. 8 is a flow diagram describing one embodiment by which the end user previews, scans or extracts the attachment data.

FIG. 8 is a flow diagram describing one embodiment by which the end user previews, scans or extracts the attachment data. In step 604 the end user receives e-mail message 42 along with the attached HTML file 54 at his or her computer 60 and opens that e-mail message using a suitable e-mail client 62 or using a browser 64. Next, the user opens HTML file 54 in the e-mail message using a known technique such as by double clicking upon that file, choosing an option from a drop-down menu, etc. Opening the HTML file will cause the user's browser to open and to execute the HTML file.

Figure 9:
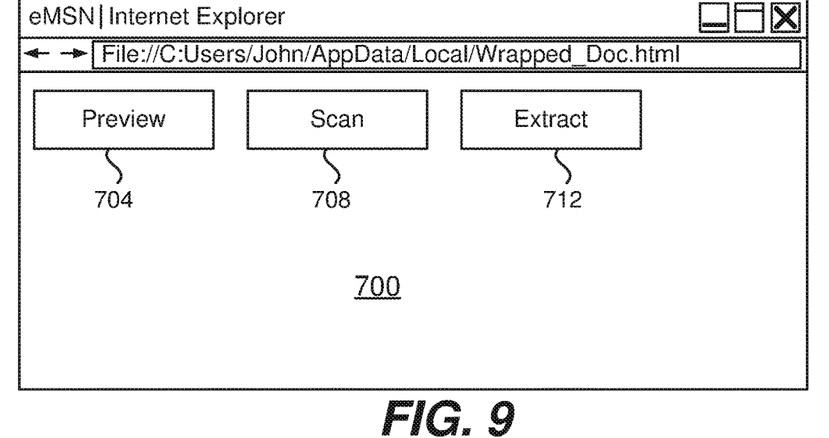
FIG. 9 illustrates a view of the user's browser once the HTML file has been opened.

FIG. 9 illustrates a view 700 of the user's browser once HTML file 54 has been opened. Shown is a preview button 704 allowing the user to preview some of the attachment data in HTML format, a scan button 708 allowing the user to send all of the original attachment data back to scan server 30 for another scan, an extract button 712 allowing the user to extract all of the original attachment data from the HTML file in order to save it locally on a hard disk. Advantageously, all of the original attachment data only exists within this HTML file (i.e., it has not been sent to a remote server for storage or scanning), thus, the privacy of the user's e-mail messages, attachments, etc. is protected. If the user is using Webmail and does not have an e-mail client, the attachment will also be stored in the cloud along with the e-mail message. That is, the Webmail server stores the whole message including the attachment in the cloud.

In step 612 the user chooses to click the Preview button 704 in order to preview the attachment data that has been saved into the HTML file in HTML format. Accordingly, the HTML code executes and in step 616 preview data from the attachment is retrieved from section 412 of the HTML file and is then displayed in the user's browser. As mentioned above, this preview data displayed will not display any macro scripts or other malware (having been removed by the scan server during conversion) and may not have the exact same formatting as the original attachment.

Figure 10:
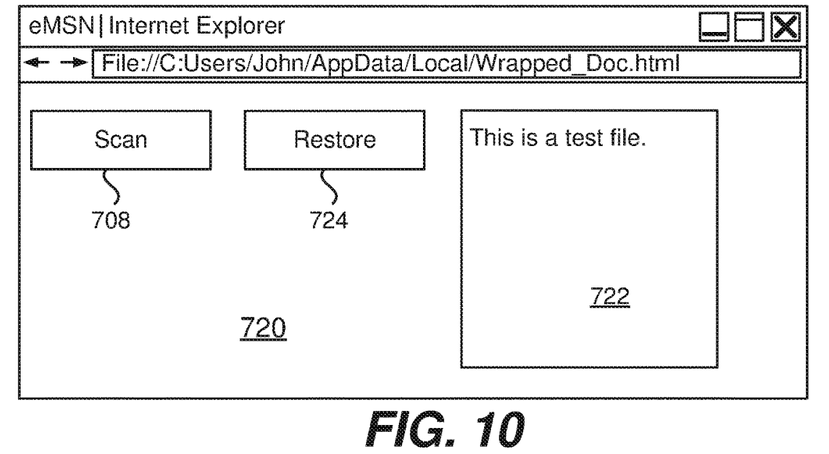
FIG. 10 illustrates a view of the user's browser after the Preview button has been clicked.

FIG. 10 illustrates a view of the user's browser after the Preview button has been clicked. Shown is a display 722 in HTML format of the preview data from section 412 from the original attachment 44. In this simple example the preview data is the same as the original attachment data. Also shown is the Scan button 708 (which the user may click) and a Restore button 724 which, when clicked in step 620, restores the user's browser to screen 700 shown in FIG. 9. The advantage to showing the attachment in a preview mode in HTML format is that HTML format can keep same format (typeface, size, font, highlight, color, etc.) as in the original attachment. Thus, the end user can easily find the necessary information.

Alternatively, in step 632 the user chooses to click the Scan button 708 in order to perform an on-demand scan and have the original attachment data scanned again by scan server 30. Accordingly, in step 636, JavaScript code in the HTML file will send the original attachment data to scan server 30 for a second scan (or a first scan if it had not been scanned originally). The original attachment data may be sent to the scan server from user computer 60 in different manners. In one particular embodiment, the JavaScript uses an HTTP request (post method) to send the original attachment data (found in section 408 of the HTML file) to the backend scan server 30 and waits for an HTTP response. The scan server performs the scanning and puts the result into the HTTP response which is returned to the browser 64 of the user computer 60. JavaScript in the HTML file then parses the HTTP response and renders the result to the user in the browser directly. Once the scan is finished, the scan server deletes the original attachment data it has in its possession and does not store any data.

Figure 11:
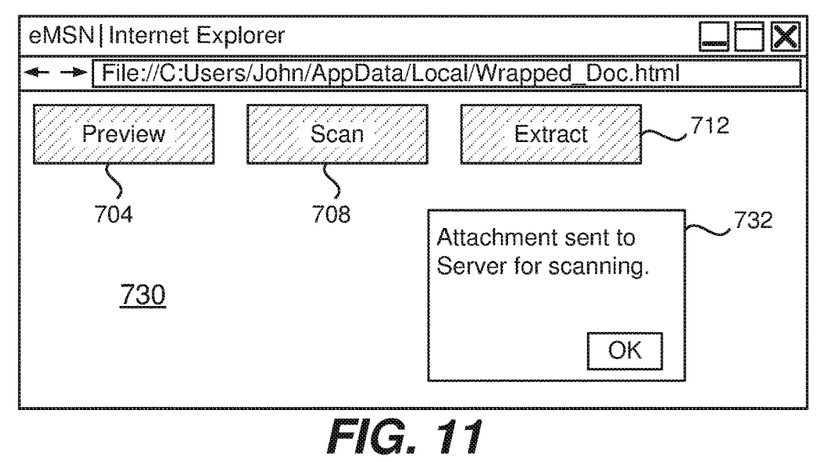
FIG. 11 illustrates a view of the user's browser after the Scan button has been clicked.

FIG. 11 illustrates a view 730 of the user's browser after the Scan button has been clicked. Shown is a message 732 to the user indicating that the attachment has been sent to the scan server for scanning. Also shown are the Preview button 704, the Scan button 708, and the Extract button 724, each of which is shown in gray indicating that the user may not click upon them. Once the "OK" button in window 732 is clicked the user's browser is restored to screen 700 shown in FIG. 9.

The result of the scan may be that no malware is found in the attachment or may be that malware is found in the attachment. If no malware is found, then the JavaScript may simply return the user's browser to the view 700 shown in FIG. 9 or may pop up a simple window indicating that no malware is found. On other hand, if malware is found the scan server will send this result back to JavaScript in the HTML file which, in step 640, will then warn the user with an appropriate message such as "malware found," "attachment contains malicious software, "delete this e-mail message," "delete the attachment," etc. As mentioned earlier, malware may be found in the attachment during this second, on-demand scan because the virus pattern file of the scan server has been updated and now includes a new virus signature for any zero-day malware present in the attachment.

Figure 12:
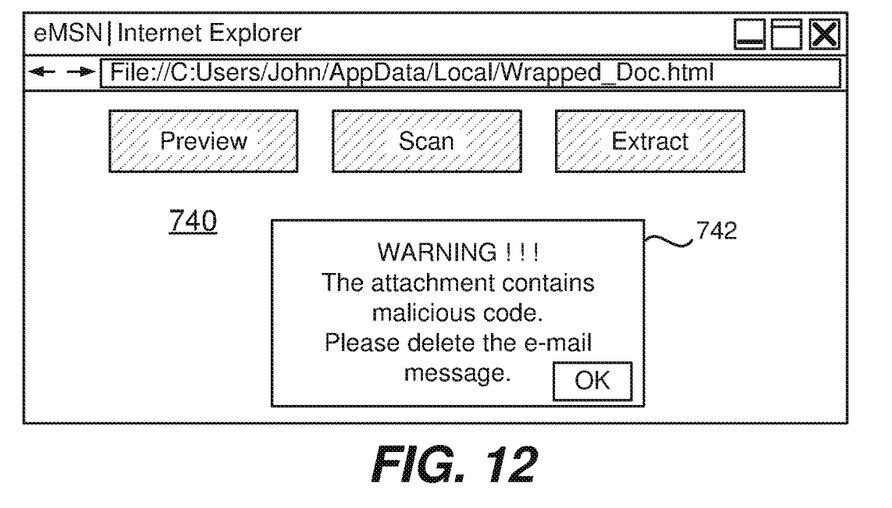
FIG. 12 illustrates a view of the user's browser after the scan server has returned a result of malware.

FIG. 12 illustrates a view 740 of the user's browser after the scan server has returned a result of malware. Shown is a message 742 to the user indicating that the attachment contains malicious code and that the e-mail message should be deleted by the user. Also shown are the Preview button 704, the Scan button 708, and the Extract button 724, each of which is shown in gray indicating that the user may not click upon them. Once the "OK" button in window 742 is clicked the user's browser is restored to screen 700 shown in FIG. 9.

In step 680 the user may take action in response to this warning message 742. In fact, upon first receiving the e-mail message in step 604 the user may take any of these actions and at any point in time during the above flow. By way of example, if malware has been found the user may delete the e-mail message containing the HTML file 54, may flag the e-mail message (using options in the e-mail client or in the browser) as being spam, as being phishing (in which case the e-mail client or Webmail will delete the message), etc. In addition, if the user is done with the HTML file the user may simply close the tab in which the HTML file is opened or close the browser itself.

In addition to the user taking action step 680, scan server 30 may also take action when it determines that the attachment is malicious after the on-demand scan. By way of example, the scan server may pop up a warning message and disable extracting the original attachment. The scan server is not able to delete messages on the user computer's e-mail client. Further, the HTML file itself is capable of taking action such as alerting the user or disabling the extract function.

Alternatively, in step 652 the user chooses to click the Extract button 712 in order to save the original attachment data to local storage on his or her computer 60. Accordingly, in step 656, JavaScript code in the HTML file opens a dialog box within the user browser to ask if the user would like to save or open the original attachment. As mentioned, because the preview data stored in the HTML file does not include any macro scripts and may not have the original formatting the user may desire to save or view the original attachment data with all included scripts, formatting, etc. The original attachment stored in section 408 of the HTML file includes all formatting, commands, etc., in order to save or open the original attachment in its original format. For example, if the original attachment is a Microsoft Word document, the original attachment data stored in section 408 will include all formatting and commands necessary to save the original attachment data as a Microsoft Word document or to open the original attachment data in the Microsoft Word application. The original data will include all this formatting, that is, we keep the binary data of the original attachment, so that all information will be kept.

Figure 13:
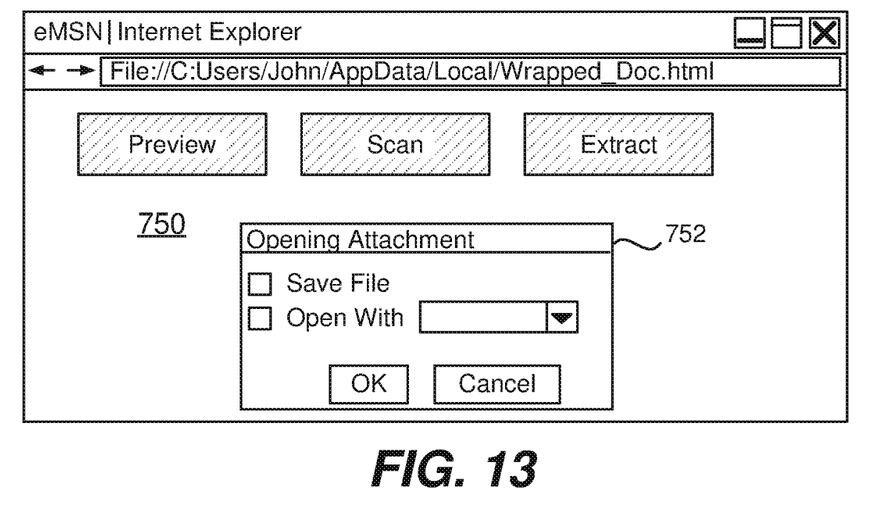
FIG. 13 illustrates a view of the user's browser after the user has selected Extract.

FIG. 13 illustrates a view 750 of the user's browser after the user has selected Extract. Shown is a dialog box 752 indicating that user may choose to save the original attachment data or open it with an application such as Microsoft Word, Excel, etc. (depending upon the type of the attachment). Also shown are the Preview button 704, the Scan button 708, and the Extract button 724, each of which is shown in gray indicating that the user may not click upon them. The user then selects "Save" or "Open" and once the user clicks the "OK" button in window 752 the original attachment it will be saved or opened. If "Save" is chosen, then in step 660 the HTML file extracts the original attachment data from region 408 of the HTML file and saves it to the location chosen by the user, such as permanent storage on computer 60, a location in the network of the enterprise, in cloud storage service, etc. The user may also choose to open the attachment in which case the original attachment is opened in the appropriate application, but, there is a risk in opening the attachment as it may contain malicious macro scripts. As mentioned earlier, once the user is finished choosing any of the options in FIG. 8 he or she may simply close the tab that contains the HTML file, close the browser, etc.

Computer System Embodiment

Figure 14A:
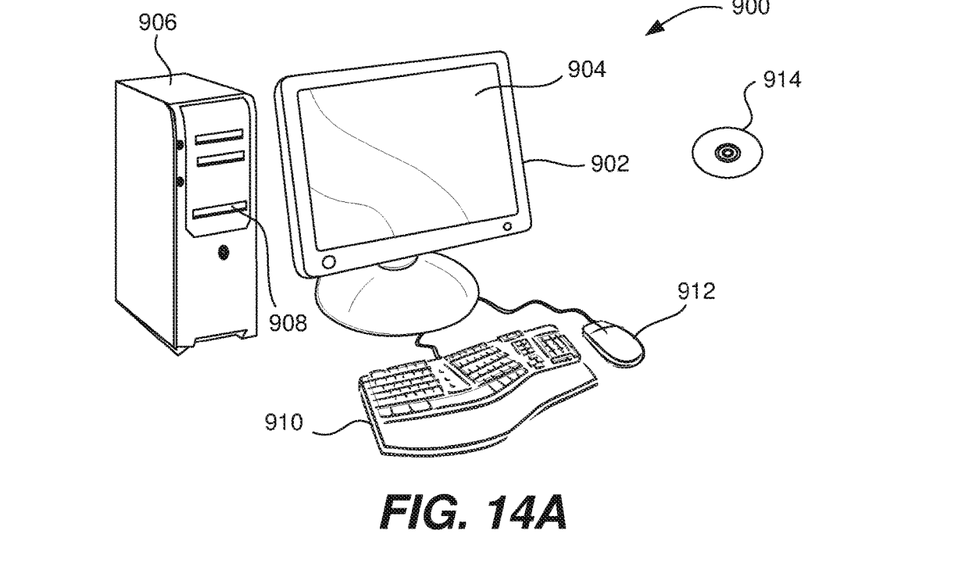
FIGS. 14A and 14B illustrate a computer system suitable for implementing embodiments of the present invention.
Figure 14B:
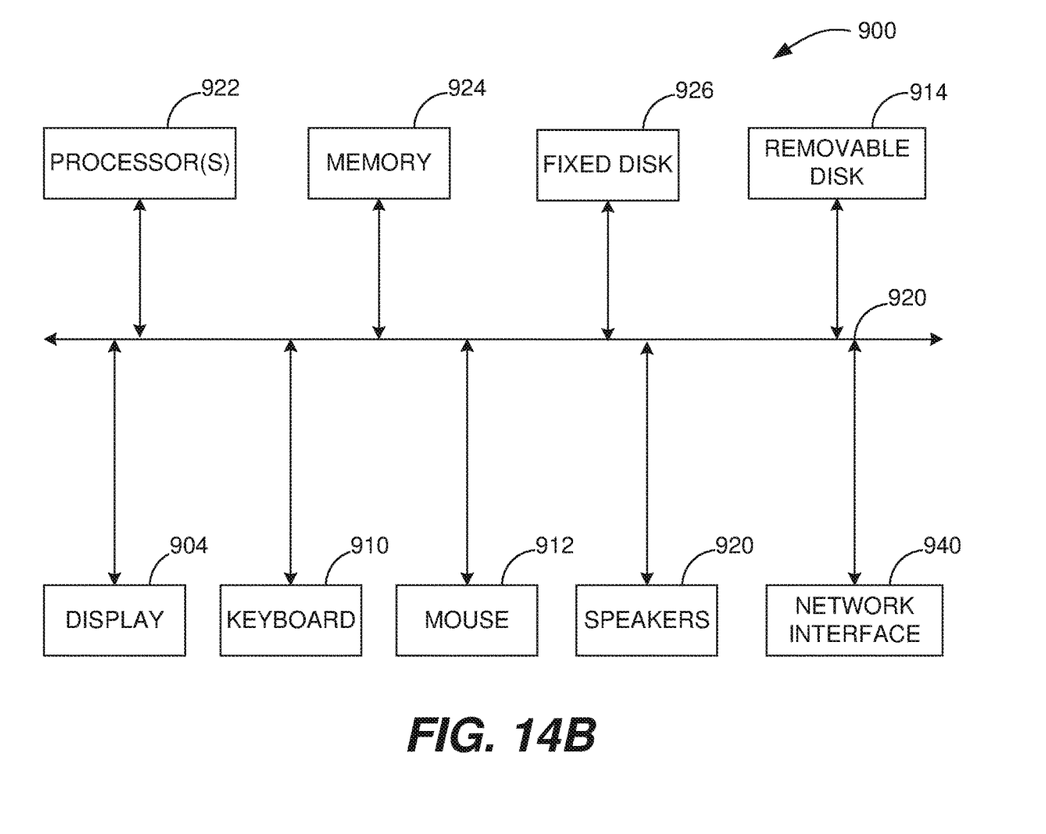

FIGS. 14A and 14B illustrate a computer system 900 suitable for implementing embodiments of the present invention. FIG. 14A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 14B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of detecting malware in an e-mail attachment, said method comprising:
    receiving an e-mail message having an attachment at an e-mail gateway of an enterprise;
    converting said attachment into an HTML file;
    removing malicious code from said attachment during said converting into said HTML file, wherein said HTML file does not include said malicious code, and wherein said HTML file includes text of said attachment and preview functionality enabling a user to preview said text in HTML format when said HTML file is executed in a browser; and
    replacing said attachment with said HTML file and delivering said e-mail message having said HTML file to a user computer of said enterprise, said attachment not being attached to said delivered e-mail message, whereby a user is able to preview said text in HTML format in a browser of said user computer.

2. A method as recited in claim 1 further comprising:
    receiving a selection on said user computer to open said HTML file in said browser;
    executing said HTML file and displaying a preview button in said browser; and
    receiving a selection of said preview button and previewing said text in HTML format in said browser.

3. A method as recited in claim 1 wherein said malicious code is at least one macro script.

4. A method as recited in claim 1 further comprising:
    receiving a selection on said user computer to delete said delivered e-mail message having said HTML file.

5. A method as recited in claim 1 further comprising:
    performing a scan for malware on said attachment when said e-mail message is received in said e-mail gateway and determining that said attachment does not include malicious code.

6. A method as recited in claim 1 wherein said attachment is a Microsoft Office document.

7. A method of detecting malware in an e-mail attachment, said method comprising:
    receiving an e-mail message having an attachment at an e-mail gateway of an enterprise;
    converting said attachment into an HTML file;
    removing malicious code from said attachment during said converting into said HTML file, wherein said HTML file does not include said malicious code, and wherein said HTML file includes said attachment and scan functionality enabling a user to send said attachment from a user computer to a scan server of said enterprise when said HTML file is executed in a browser; and
    replacing said attachment with said HTML file and delivering said e-mail message having said HTML file to said user computer of said enterprise, said attachment not being attached to said delivered e-mail message, whereby a user is able to execute said HTML file in said browser of said user computer.

8. A method as recited in claim 7 further comprising:
    receiving, at said scan server, said attachment from said user computer;
    scanning said attachment and detecting malicious code; and
    returning a warning to said user computer to be displayed by said HTML, file in said browser.

9. A method as recited in claim 7 further comprising:
    receiving, at said scan server, said attachment from said user computer;
    scanning said attachment and detecting malicious code; and
    deleting said e-mail message in said enterprise by said scan server.

10. A method as recited in claim 7 further comprising:
    performing a scan on said attachment when said e-mail message is received in said e-mail gateway using a first virus pattern file and determining that said attachment does not include malicious code;
    receiving, at said scan server, said attachment from said user computer;
    scanning said attachment using a second virus pattern file different from said first virus pattern file and detecting malicious code; and
    returning a warning to said user computer to be displayed by said HTML file in said browser.

11. A method as recited in claim 7 further comprising:
    performing a scan on said attachment when said e-mail message is received in said e-mail gateway using a first virus pattern file and determining that said attachment does not include malicious code;
    receiving, at said scan server, said attachment from said user computer;
    scanning said attachment using a second virus pattern file different from said first virus pattern file and detecting malicious code; and
    deleting said e-mail message in said enterprise by said scan server.

12. A method as recited in claim 7 further comprising:
    receiving a selection on said user computer to open said HTML, file in said browser;
    executing said HTML file and displaying a scan button in said browser; and
    sending said attachment from said HTML file to said scan server when said scan button is selected.

13. A method as recited in claim 12 further comprising:
    receiving a selection on said user computer to delete said delivered e-mail message after receiving a response from said scan server.

14. A method of detecting malware in an e-mail attachment, said method comprising:
    receiving an e-mail message having an attachment at an e-mail gateway of an enterprise;
    converting said attachment into an HTML file;
    removing malicious code from said attachment during said converting into said HTML file, wherein said HTML file does not include said malicious code, and wherein said HTML file includes all data of said attachment and extract functionality enabling a user to extract said all data of said attachment from said HTML file when said HTML file is executed in a browser; and
    replacing said attachment with said HTML file and delivering said e-mail message having said HTML file to a user computer of said enterprise, said attachment not being attached to said delivered e-mail message, whereby a user is able to extract said all data of said attachment from said HTML file in a browser of said user computer.

15. A method as recited in claim 14 wherein said extract functionality enables said user to save said all data of said attachment in storage of said user computer or enables said user to open said all data said attachment in an application corresponding to said attachment.

16. A method as recited in claim 14 further comprising:
receiving a selection on said user computer to open said HTML file in said browser;
executing said HTML file and displaying an extract button in said browser; and
receiving a selection of said extract button and saving said all data of said attachment in storage of said user computer in a format corresponding to an application of said attachment.

17. A method as recited in claim 14 further comprising:
receiving a selection on said user computer to open said HTML, file in said browser;
executing said HTML file and displaying an extract button in said browser; and
receiving a selection of said extract button and opening said all data of said attachment in an application on said user computer in a format corresponding to said attachment.

18. A method as recited in claim 14 further comprising:
receiving a selection on said user computer to delete said delivered e-mail message having said HTML file.

19. A method as recited in claim 14 further comprising:
performing a scan for malware on said attachment when said e-mail message is received in said e-mail gateway and determining that said attachment does not include malicious code.

20. A method as recited in claim 14 wherein said attachment is a Microsoft Office document.

21. A method of detecting malware in an e-mail attachment, said method comprising:
receiving an e-mail message having an attachment at an e-mail gateway of an enterprise;
converting said attachment into a PDF file;
converting said PDF file into an HTML file;
removing malicious code from said attachment during said converting into a PDF file, wherein said HTML file does not include said malicious code, and wherein said HTML file includes text of said attachment and preview functionality enabling a user to preview said text in HTML format when said HTML file is executed in a browser; and
replacing said attachment with said HTML file and delivering said e-mail message having said HTML file to a user computer of said enterprise, said attachment not being attached to said delivered e-mail message, whereby a user is able to preview said text in HTML format in a browser of said user computer.

22. A method of detecting malware in an e-mail attachment, said method comprising:
receiving an e-mail message having an attachment at an e-mail gateway of an enterprise;
converting said attachment into a PDF file;
converting said PDF file into an HTML file;
removing malicious code from said attachment during said converting into a PDF file, wherein said HTML file does not include said malicious code, and wherein said HTML file includes said attachment and scan functionality enabling a user to send said attachment from a user computer to a scan server of said enterprise when said HTML file is executed in a browser; and
replacing said attachment with said HTML file and delivering said e-mail message having said HTML file to said user computer of said enterprise, said attachment not being attached to said delivered e-mail message, whereby a user is able to execute said HTML file in said browser of said user computer.

23. A method of detecting malware in an e-mail attachment, said method comprising:
receiving an e-mail message having an attachment at an e-mail gateway of an enterprise;
converting said attachment into a PDF file;
converting said PDF file into an HTML file;
removing malicious code from said attachment during said converting into a PDF file, wherein said HTML file does not include said malicious code, and wherein said HTML file includes all data of said attachment and extract functionality enabling a user to extract said all data of said attachment from said HTML file when said HTML file is executed in a browser; and
replacing said attachment with said HTML file and delivering said e-mail message having said HTML file to a user computer of said enterprise, said attachment not being attached to said delivered e-mail message, whereby a user is able to extract said all data of said attachment from said HTML file in a browser of said user computer.

\* \* \* \* \*